(12) United States Patent
Abou-Rizk et al.

(10) Patent No.: US 10,523,704 B2
(45) Date of Patent: Dec. 31, 2019

(54) METHODS AND APPARATUS FOR IDENTIFICATION AND RANKING OF SYNTHETIC LOCATIONS FOR MOBILE APPLICATIONS

(71) Applicant: Verve Wireless, Inc., Carlsbad, CA (US)

(72) Inventors: Mitri Abou-Rizk, Newton, MA (US); Brian Crook, Encinitas, CA (US); Eric M. Johnston, Chatham, NJ (US); Gary Ng, Carlsbad, CA (US); Chris Nicotra, Ashburn, VA (US)

(73) Assignee: Verve Wireless, Inc., Carlsbad, CA (US)

(*) Notice: Subject to any disclaimer, the term of this patent is extended or adjusted under 35 U.S.C. 154(b) by 587 days.

(21) Appl. No.: 14/615,129

(22) Filed: Feb. 5, 2015

(65) Prior Publication Data

US 2015/0222659 A1  Aug. 6, 2015

Related U.S. Application Data

(60) Provisional application No. 61/936,144, filed on Feb. 5, 2014.

(51) Int. Cl.
*H04L 29/06* (2006.01)
*H04W 4/029* (2018.01)
(Continued)

(52) U.S. Cl.
CPC .......... *H04L 63/1466* (2013.01); *G01S 19/03* (2013.01); *G06F 21/57* (2013.01);
(Continued)

(58) Field of Classification Search
CPC ... H04L 63/12; H04L 63/126; H04L 63/1441; H04L 63/1466
(Continued)

(56) References Cited

U.S. PATENT DOCUMENTS 7,072,963 B2 *  7/2006  Anderson et al. ............ 709/225
7,366,919 B1    4/2008  Sobel et al.
(Continued)

FOREIGN PATENT DOCUMENTS

LU           92 064 A1    11/2013
WO   WO 2009/151925 A2   12/2009

OTHER PUBLICATIONS

European Search Report for European Patent Application No. 15745924.9, dated Jul. 5, 2017.
(Continued)

*Primary Examiner* — Saleh Najjar
*Assistant Examiner* — Peiliang Pan
(74) *Attorney, Agent, or Firm* — Cooley LLP

(57) ABSTRACT

Some embodiments described herein relate to a method of defining and/or calculating an accuracy score for untrusted location data. The method can include receiving multiple signals including location data. Some or all of the signals may include untrusted location data. When a signal including location data is received, that location data can be stored, for example in a database. The accuracy score can be defined based on the number of entries in the database matching the received location data. If location data is statistically overrepresented in the database, it may be an indication that the location data has been assigned by an untrusted third party, rather than organically determined by the mobile communication device. Accordingly, a relatively low accuracy score indicating that the location data is synthetic can be defined when received location data matches a location that is statistically overrepresented in the database.

24 Claims, 4 Drawing Sheets

(51) Int. Cl.
*H04W 12/12* (2009.01)
*G06F 21/57* (2013.01)
*G01S 19/03* (2010.01)
*H04W 12/02* (2009.01)
*H04W 4/21* (2018.01)
*H04W 12/10* (2009.01)
*G01S 19/21* (2010.01)
*H04W 12/00* (2009.01)

(52) U.S. Cl.
CPC ......... *H04L 63/1425* (2013.01); *H04W 4/029* (2018.02); *H04W 12/02* (2013.01); *H04W 12/12* (2013.01); *G01S 19/21* (2013.01); *G06F 2221/2113* (2013.01); *H04L 63/123* (2013.01); *H04W 4/21* (2018.02); *H04W 12/00503* (2019.01); *H04W 12/10* (2013.01)

(58) Field of Classification Search
USPC ...................................................... 726/2, 11
See application file for complete search history.

(56) References Cited

U.S. PATENT DOCUMENTS

| | | | |
|---|---|---|---|
| 2003/0023541 A1* | 1/2003 | Black et al. | 705/37 |
| 2003/0074471 A1* | 4/2003 | Anderson et al. | 709/245 |
| 2003/0123465 A1* | 7/2003 | Donahue | 370/401 |
| 2003/0146871 A1* | 8/2003 | Karr et al. | 342/457 |
| 2003/0176965 A1* | 9/2003 | Padmanabhan | 701/207 |
| 2003/0216143 A1* | 11/2003 | Roese et al. | 455/456.1 |
| 2004/0193691 A1* | 9/2004 | Chang | 709/206 |
| 2007/0149216 A1* | 6/2007 | Misikangas | 455/456.1 |
| 2009/0119106 A1* | 5/2009 | Rajakumar et al. | 704/246 |
| 2009/0164269 A1 | 6/2009 | Gupta et al. | |
| 2010/0127920 A1 | 5/2010 | Harper et al. | |
| 2010/0127928 A1* | 5/2010 | Thomson et al. | 342/357.15 |
| 2010/0134352 A1* | 6/2010 | Thomson et al. | 342/357.09 |
| 2010/0316300 A1* | 12/2010 | Epshtein et al. | 382/229 |
| 2010/0324813 A1 | 12/2010 | Sundararajan et al. | |
| 2011/0287779 A1* | 11/2011 | Harper | 455/456.1 |
| 2012/0304292 A1* | 11/2012 | Liu et al. | 726/22 |
| 2012/0309408 A1* | 12/2012 | Marti et al. | 455/456.1 |
| 2013/0117848 A1* | 5/2013 | Golshan et al. | 726/23 |
| 2013/0160120 A1* | 6/2013 | Malaviya et al. | 726/23 |
| 2013/0254891 A1* | 9/2013 | Onoda | 726/23 |
| 2013/0328931 A1* | 12/2013 | Wolcott et al. | 345/633 |
| 2013/0346202 A1 | 12/2013 | Kouladjie et al. | |
| 2014/0074746 A1* | 3/2014 | Wang | 705/341 |
| 2014/0232593 A1* | 8/2014 | Varoglu | 342/357.28 |

OTHER PUBLICATIONS

International Search Report and Written Opinion dated Jul. 13, 2015 for International Patent Application No. PCT/US2015/014580, filed Feb. 5, 2015, 9 pages.

* cited by examiner

METHODS AND APPARATUS FOR IDENTIFICATION AND RANKING OF SYNTHETIC LOCATIONS FOR MOBILE APPLICATIONS

This application claims the benefit of provisional U.S. Patent Application No. 61/936,144, filed Feb. 5, 2014, under 35 U.S.C. § 119(e), the disclosure of which is hereby incorporated by reference in its entirety.

BACKGROUND

Some embodiments described herein relate generally to methods and apparatus for analyzing the quality and/or accuracy of geographical coordinates. More specifically, some embodiments described herein relate to detecting spoofed geographical coordinates.

Many mobile communication devices are Global Positioning System (GPS) capable devices and are operable to determine their location with a very high degree of accuracy. Furthermore, many communication networks, including cellular telephone networks, are operable to determine the location of mobile communication devices within their networks with a high degree of accuracy, for example based on antenna location and signal strength data. Such location data can be useful to many remote service providers including activity tracking services, traffic monitoring services, social networking services, location providers, advertisers, etc.

Location data associated with mobile communication devices, however, frequently pass through third parties, such as application (app) providers, the network carrier, or others, who may alter or supplement the location data. For example, some third parties may generalize or alter location data in an effort to protect user privacy. Other third parties may infer a location of a mobile location device based on relatively low-accuracy proxies, such as Internet Protocol (IP) address, or area code. Because location data associated with mobile phones can be valuable to service and content providers, some third parties may append location data to traffic without having any basis for the appended location data.

In known systems, service providers who obtain location data have been unable to determine whether intermediate third parties have altered or supplemented the location data. A need therefore exists for methods and apparatus for evaluating location data, detecting spoofed location data, and/or assigning accuracy scores to location data.

DETAILED DESCRIPTION

Figure 1:
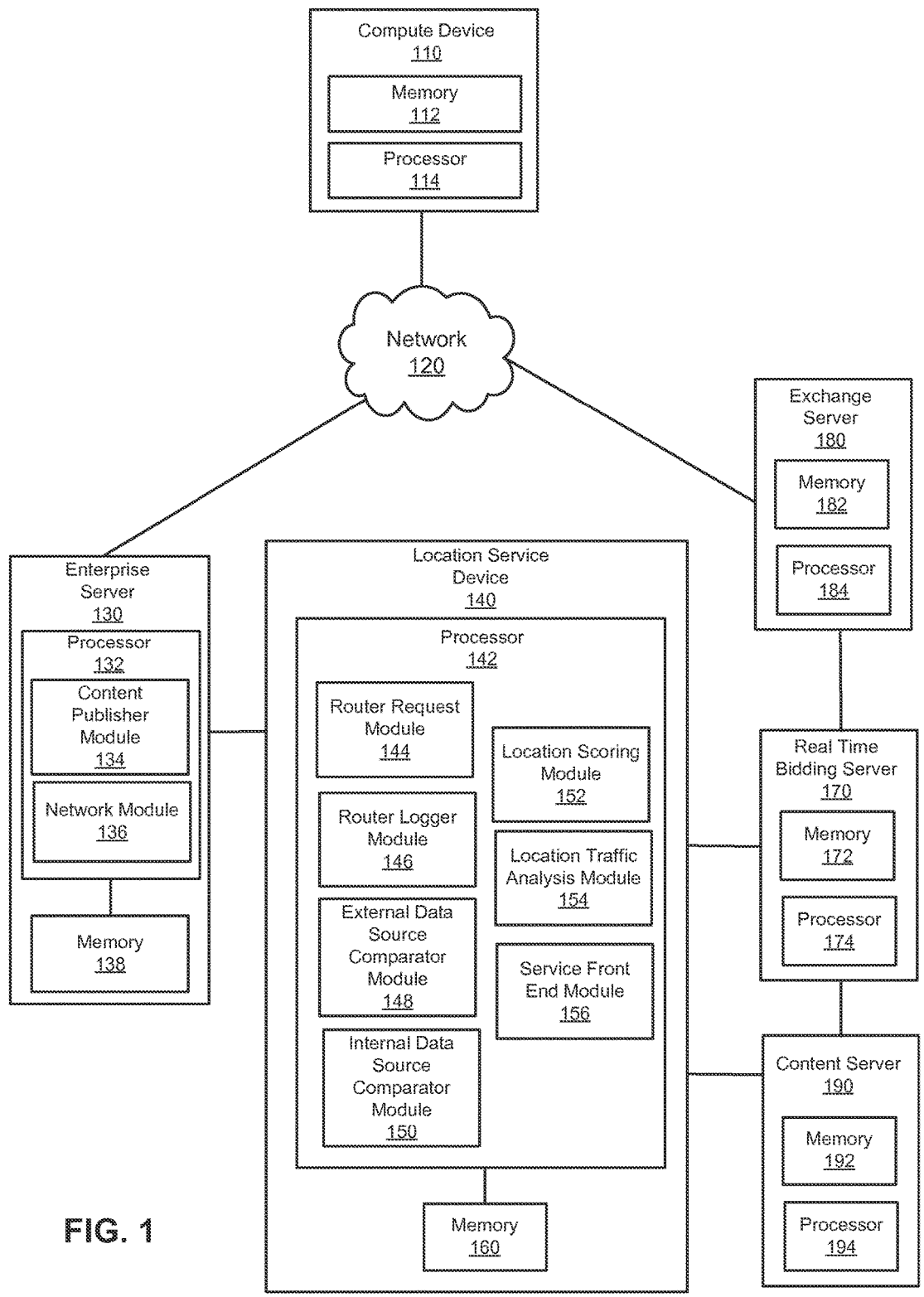
FIG. 1 is a schematic illustration of a system for detecting untrusted location source information and ranking the quality of such data, according to an embodiment.

Some embodiments described herein relate to an apparatus having a network module, a first data source comparator module, a second data source comparator module, and a spoofed location detection module. The network module can be operable to send and receive signals including signals having location data purporting to represent one or more locations at which one or more mobile communication devices have been located. When a signal including location data is received by the network module, the location data can be stored in a local memory, in a database, in cloud storage, etc. In some instances, a signal including location data may have passed through or may have been received from intermediary third party device. Similarly stated, some signals may not have been received directly from the mobile communication device and/or the location data may have been altered by the intermediary third party. Furthermore, such signals may or may not include an indication that it passed through an intermediary third party. Thus, in instances where location data is not received in a verifiably unaltered state from the mobile communication device, the location data can be considered to be untrusted location data representing an untrusted location.

The first data source comparator module can be operable to compare untrusted location data included with a signal received by the network module to a database of known spoofed locations. The second data source comparator module can be operable to compare untrusted location data included in the signal with previously-received location data. The spoofed location detection module can be operable to determine if an untrusted location is a spoofed location and/or calculate an accuracy score for the untrusted location based, at least in part, on (1) determining if the first data source comparator module defined a match between the untrusted location and an entry in the database of spoofed locations and (2) determining if the second data source comparator module determined that the untrusted location is statistically overrepresented in the previously-received location data. The spoofed location detection module can be operable to calculate and/or define an accuracy score representing a confidence that the untrusted location data is organic (e.g., that the untrusted location data was calculated by a mobile communication device and/or that the untrusted location data has not been altered by a third-party intermediary). The network module can be operable to send the untrusted location data and/or the accuracy score such that a service provider can evaluate the likelihood that the untrusted location data is spoofed.

Some embodiments described herein relate to a method of defining and/or calculating an accuracy score for untrusted location data. The accuracy score can be based, at least in part, on a comparison of untrusted location data to a database of predefined synthetic locations (also referred to herein as "spoofed") locations. In some instances, each predefined synthetic location can represent a known spoofed location. For example, a predefined synthetic location can be a single location that a third party (e.g., an untrusted third party) represents as corresponding to multiple locations. For example, a third party, such as an app provider may perform a reverse-IP address lookup and assign all devices having an IP address in a particular range to an individual location listed in a IP address lookup table. As another example, a network provider may append or modify location data to point to a centroid of a zipcode, city, etc. to mask private location data for the mobile communication device user. Thus, the third party assigns one location (the location listed in the IP address lookup table, the centroid, etc.) to multiple locations (any location within the IP address range for the location listed in the IP address lookup table, any location in the zip code, etc.). Some methods described herein can include accessing the IP lookup table, a list of centroids of geographical regions, etc. and identifying the locations included therein as a predetermined synthetic locations. The accuracy score and/or the untrusted location data can be sent to a server, such as fitness tracking server. The server can determine whether to use the untrusted location data and/or how much weight to afford or assign to the untrusted location data based on the accuracy score.

Some embodiments described herein relate to a method of defining and/or calculating an accuracy score for untrusted location data. The method can include receiving multiple signals including location data. Some or all of the signals may include untrusted location data. When a signal including location data is received, that location data can be stored, for example in a database. The accuracy score can be defined based on the number of entries in the database matching the received location data. Some untrusted third parties repeatedly provide the same location data. Thus, if the same location is received repeatedly, it can be an indication that the location is inaccurate and/or synthetic. Therefore, if location data is statistically overrepresented in the database, it may be an indication that the location data has been assigned by an untrusted third party, rather than organically determined by the mobile communication device. Accordingly, a relatively low accuracy score indicating that the location data is synthetic can be defined when received location data matches a location that is statistically overrepresented in the database.

Some embodiments described herein relate to accuracy, accurate location data, and/or inaccurate location data. Some embodiments described herein relate to precision, precise location data and/or imprecise location data. Although in some contexts the terms accuracy and precision are used interchangeably, in the present application, location data is considered to be accurate if it conforms to the actual location it is purporting to represent. For example, if location data indicates that a mobile communication device is in Central Park in New York City, it is accurate location data if the mobile communication device is actually in Central Park. Conversely, if the mobile communication device is not actually in Central Park, the location data is inaccurate. Inaccurate location data may be supplied by estimation (e.g., based on cell tower data, reverse-IP lookup, etc.), anonymization (e.g., a nearby but inaccurate location is supplied to mask the actual location of the device for privacy purposes), or fraud (e.g., a third party may append false location data to a signal to increase the value of their datastore).

As used in the present application, precision of location data is a measure of the size of an area uniquely identified by the location data. For example, a location represented by lat-long coordinates with six decimal digits is more precise than a location represented by lat-long coordinates with three decimal digits. Location data can include any combination of accuracy and precision. For example, location data can be highly precise but very inaccurate (e.g., identifying a six square inch location in Los Angeles when the mobile communication device is in New York) or very accurate but imprecise (e.g. identifying a 200 square mile location within which the mobile communication device is actually located). Accuracy scores described herein can include a measure of both accuracy and precision. For example, very precise location data that is inaccurate by ten feet can receive a higher accuracy score than very accurate location data with poor precision (e.g., data identifying a 200 square mile location within which the mobile communication device is actually located). Data with a high accuracy score can have the potential to command a premium rate from various service providers, app developers, data brokers and/or advertisers. For example, a traffic monitoring service may have an interest in location data associated with mobile communication devices to identify commonly traveled routes, identify real time traffic conditions, such as traffic jams, and so forth. The traffic monitoring service, however, may only be interested in high-accuracy, high-precision data in order to pinpoint mobile devices on particular roads. Therefore, the traffic monitoring service may be willing to pay a premium for vetted location data, such as location data having a high accuracy score.

As used herein, a module can be, for example, any assembly and/or set of operatively-coupled electrical components associated with performing a specific function(s), and can include, for example, a memory, a processor, electrical traces, optical connectors, software (that is stored in memory and/or executing in hardware) and/or the like.

As used herein, a "centroid" is defined as the geographical coordinates that are the mean values of the coordinates of the points in a particular set (e.g., a country, a postal code, a metropolitan area, etc.).

As used in this specification, the singular forms "a," "an" and "the" include plural referents unless the context clearly dictates otherwise. Thus, for example, the term "a compute device" is intended to mean a single compute device or a combination of compute devices.

FIG. 1 is a schematic illustration of a system for detecting untrusted location source information and appropriately ranking the quality of such data, according to an embodiment. Location source information (also referred to herein as "location data" or simply "location") (e.g., latitude and/or longitude data) can identify a location of a mobile communication device. The location source information can be untrusted when, for example, the location data is not received directly from a white-listed "trusted" data provider who is known not to alter location source information, when the location data is not received directly from the mobile communication device, and/or when the data path of the location data is unknown and/or includes an untrusted third party. The system 100 shown in FIG. 1 detects and analyzes incoming signals having untrusted location source information and: (i) compares the location source information to locations known to commonly represent larger, less precise geographical areas (centroids) (for example, via the external data source comparator module 148 discussed below); (ii) compares the location source information with known (or historical) location source information and/or known mobile ad requester information (for example, via the internal data source comparator module 150 and the location traffic analysis module 154 discussed below); (iii) scores, ranks and/or assigns a accuracy value to the location source based on the results of said comparisons (for example, via the location scoring module 152 discussed below) and; (iv) transmits the location source information and/or the accuracy value (also referred to herein as "trusted location data," "trusted location source information," and "trusted data") that are appropriately scored and ranked (for example, via the service front end module 156 discussed below).

The system 100 includes a compute device 110, a network 120, an enterprise server 130, a location service device 140, a real-time bidding server 170, an exchange server 180, and an content server 190. The compute device 110 can be any mobile communication or computing device such as a laptop computer, a personal digital assistant (PDA), a standard mobile telephone, a tablet personal computer (PC), and/or so forth. Although only one compute device 110 is shown in FIG. 1, any number of compute devices is possible. In other embodiments, any suitable location-based service provider (e.g., a exercise tracking service) can be substituted for one or more of the real-time bidding server 170, the exchange server 180, and the content server 190. The compute device 110 can be the source of a mobile ad requests and/or can trigger a mobile ad request. Such a mobile ad request can be triggered, for example, when the compute device 110 downloads and/or accesses a webpage of an enterprise such as, for example, a commercial business as described herein (e.g., the enterprise webpage is supported by the enterprise server 130).

The compute device 110 includes a memory 112 and a processor 114. The memory 112 can be, for example, a random access memory (RAM), a memory buffer, a hard drive, a database, an erasable programmable read-only memory (EPROM), an electrically erasable read-only memory (EEPROM), a read-only memory (ROM) and/or so forth. The memory 112 can store instructions to cause the processor 114 to execute modules, processes and/or functions associated with the compute device 110. The processor 114 can be a general purpose processor, a Field Programmable Gate Array (FPGA), an Application Specific Integrated Circuit (ASIC), a Digital Signal Processor (DSP), and/or the like. The processor 114 can run and/or execute applications, modules, processes and/or functions associated with the compute device 110 and/or the system 100.

The network 120 can be any type of network (e.g., a local area network (LAN), a wide area network (WAN), a virtual network, and a telecommunications network) implemented as a wired network and/or wireless network. As described in further detail herein, in some embodiments, for example, the compute device 110 can be connected to the enterprise server 130 and/or the location service device 140 via network 120 that can include an intranet, an Internet Service Provider (ISP) and the Internet, a cellular network (e.g., network 120), and/or the like.

The enterprise server 130 can be, for example, a web server, an application server, a proxy server, a telnet server, a file transfer protocol (FTP) server, a mail server, a list server, a collaboration server and/or the like. The enterprise server 130 can be, for example, a server associated with, accessed by or owned by a commercial business (e.g., Starbucks coffee, Apple Inc., etc.), a news agency (e.g., Cable News Network (CNN), the Washington Post, etc.), a government agency, an educational institution, a policy think tank, a sporting agency (e.g., Washington Redskins, Baltimore Ravens, etc.), a non-profit organization or any individual. The enterprise server 130 is the requester of a mobile ad because the enterprise server 130 can support one or multiple webpages (or websites) that can include "ad tags" that can point to location service-enabled ad servers (e.g., content server 190). Such service-enabled ad servers can store ads from various organizations for geo-targeted delivery to the "ad tags" present in webpages of the enterprise, when the webpage has been downloaded and/or accessed by a mobile compute device 110.

The enterprise server 130 includes a processor 132 and a memory 138. The memory 138 can be, for example, a random access memory (RAM), a memory buffer, a hard drive, a database, an erasable programmable read-only memory (EPROM), an electrically erasable read-only memory (EEPROM), a read-only memory (ROM) and/or so forth. The memory 138 can store instructions to cause the processor 132 to execute modules, processes and/or functions associated with the enterprise server 130 and/or the system 100.

The processor 132 can be a general purpose processor, a Field Programmable Gate Array (FPGA), an Application Specific Integrated Circuit (ASIC), a Digital Signal Processor (DSP), and/or the like. In some configurations, the processor 132 can be configured to run and/or execute application modules, processes and/or functions associated with the enterprise server 130 and/or the system 100. The processor 132 includes a content publisher module 134 and an network module 136. The content publisher module 134 can be a hardware and/or software module (that is stored in memory 138 and/or executed in processor 132). The content publisher module 134 publishes and/or displays and/or substantially periodically updates the relevant contents on the different webpages associated with the enterprise. Additionally, the content publisher module 134 also defines the number, the location, the physical size and shape, and other attributes (e.g., animated ads, etc.) of the different ad tags that are located on each webpage associated with the enterprise. For example, in some instances, if the enterprise server 130 is the central server for a news agency, the content publisher module 134 can execute sub-modules, processes and/or functions associated with the proper display of US news, international news, sports news, entertainment news in the appropriate webpages controlled by that news agency. Additionally, the content publisher module 134 can execute sub-modules, processes and/or functions associated with updating periodically or substantially periodically the different kinds of "breaking" news in the headlines of the different webpages associated with or controlled by that news agency.

The network module 136 can be a hardware and/or software module (that is stored in memory 138 and/or executed in processor 132). The network module 136 can execute sub-modules, processes and/or functions associated with delivering mobile ad requests to the location service device 140, a variety of advertisers (e.g., via content server 190), ad exchange agencies (e.g., via the exchange server 180), and/or ad auctioning agencies (e.g., via the real time bidding server 170). The network module 136 can also execute sub-modules, processes and/or functions associated with receiving a set of untargeted mobile ads and/or a set of ranked geo-targeted mobile ads from the different enterprises and/or devices discussed herein. In some instances, the network module 136 can also communicate with the content publisher module 134 to determine and/or define the number, the location, the physical size and shape, and other attributes (e.g., animated ads, etc.) of the different ad tags that are located on each webpage associated with the enterprise. In some configurations, the network module 136 can be operably integrated with the content server 190 to facilitate receipt of the most highly ranked geo-targeted ads from the content server 190.

The location service device 140 can be, for example, a web server, an application server, a proxy server, a telnet server, a file transfer protocol (FTP) server, a mail server, a list server, a collaboration server, and/or the like. The location service device 140 includes a processor 142 and a memory 160. The memory 160 can be, for example, a random access memory (RAM), a memory buffer, a hard drive, a database, an erasable programmable read-only memory (EPROM), an electrically erasable read-only memory (EEPROM), a read-only memory (ROM) and/or so forth. The memory 160 can store data and/or instructions to cause the processor 142 to execute modules, processes and/or functions associated with the location service device 140 and/or the system 100. The processor 142 can be a general purpose processor, a Field Programmable Gate Array (FPGA), an Application Specific Integrated Circuit (ASIC), a Digital Signal Processor (DSP), and/or the like. In some configurations, the processor 142 can be configured to run and/or execute application modules, processes and/or functions associated with the location service device 140 and/or the system 100. The processor 142 includes a router request module 144, a router logger module 146, an external data source comparator module 148, an internal data source comparator module 150, a location scoring module 152, a location traffic analysis module 154, and an service front end module 156.

The location service device 140 can process the set of mobile ad requests to analyze possible location source information associated with the mobile ad requests. In some instances, the location service device 140 can receive mobile ad requests from the enterprise server 130 that can include highly accurate and precise location source information regarding the geographical location of the mobile compute device that generated the mobile ad request (i.e., the compute device 110 in FIG. 1). In such instances, the location service device 140 can define such mobile ad requests as including "organic" latitude and longitude information associated with the source of the ad request. Such mobile ad requests can be matched by the location service device 140 with the most closely related geo-targeted ads, and such ads (with the highest relevance) can be sent directly to the mobile compute device 110 of a user.

In other instances, the location service device 140 can receive mobile ad requests from the enterprise server 130 that do not include accurate location source information. In such instances, the location service device 140 can detect such "untrusted" location source information on the set of incoming mobile ad requests and can appropriately score and rank the quality of such information or data. In such instances, the location service device 140 can assign each location source a quality score and a accuracy value. The quality score can allow a relative ranking of each location source so that the mobile ad request with the highest scoring location source is appropriately matched with a given geo-targeted ad. In such embodiments, the accuracy value, when not included in the mobile ad request from that location source, can be derived based on the nature of the location source, and can also be used to appropriately match the mobile ad request to a geo-targeted ad.

Figure 2:
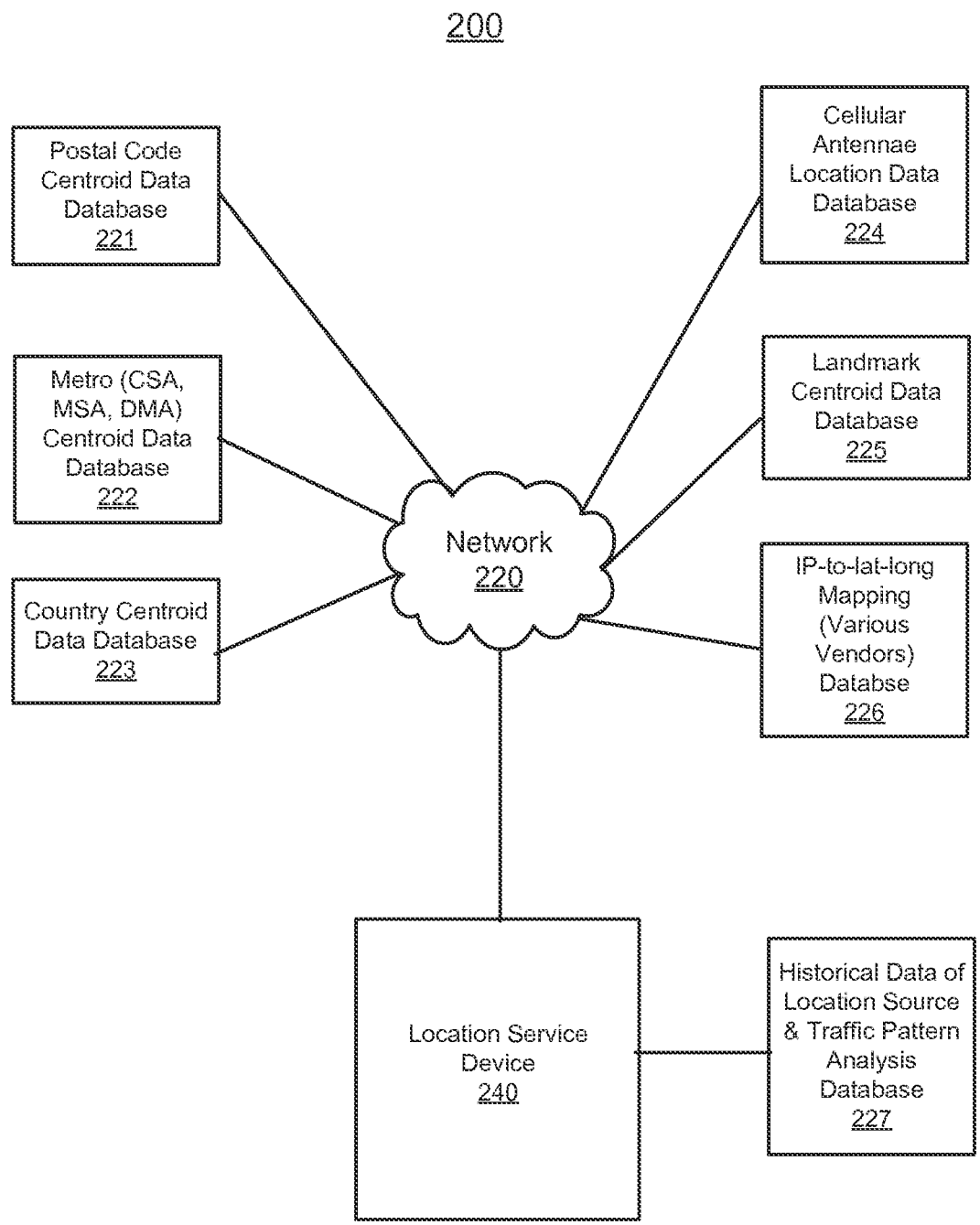
FIG. 2 is a system block diagram showing the different external data sources and internal data sources accessible to a location service device, according to an embodiment.

In some instances, when the location source information associated with a mobile ad request is "untrusted" (e.g., latitude and longitude values with no accuracy information provided by the enterprise), the location service device 140 can compare such untrusted location source information to locations known to commonly represent larger, less precise geographical areas that can either be accessed by the location service device 140 from external data sources and/or stored internally within the location service device 140 as described in greater detail in FIG. 2. If a match if found, the location service device 140 can mark and/or define the location source as "synthetic" and assign a quality score and a accuracy value suitable for the location source.

The untrusted location source information and locations known to commonly represent larger, less precise geographical areas (e.g., known spoofed locations) can each have a precision. Similarly stated, the untrusted location source information can be lat-long data with X decimal digits. The spoofed locations can be represented in the database by lat-long data with Y decimal digits. In some instances, a match can be found if the location data exactly corresponds to a location known to commonly represent a synthetic location (i.e., if the location data matched a location commonly known to represent a synthetic location and X=Y). In other instances, a match can be found if the untrusted location source information identifies a location within a spoofed location (i.e., X>Y such that the coordinates of the untrusted location source information identifies a subregion of the spoofed location). In yet other instances, a match can be found if the untrusted location includes a location identified as a spoofed location (i.e., Y>X such that the coordinates of the spoofed location identifies a subregion of the untrusted location source information).

The router request module 144 can be a hardware and/or software module (that is stored in memory 160 and/or executed in processor 142). The router request module 144 can receive a request signal from the enterprise server 130 to analyze and rank the untrusted location source information associated with an incoming mobile ad request. Such location source information can include, for example, a derived (e.g., "synthetic" or not actual) latitude value and longitude value of the source of a mobile ad request, a source (e.g., mobile compute device) IP address, a source identifier, a requester identifier, and/or any other relevant source or requester information the enterprise server 130 may include with the mobile ad request. The router request module 144 can also receive a request signal from service front end module 156 and/or the real time bidding server 170. Based on the location source information and the request signal, the router request module 144 can send a first request signal (i.e., an internal signal) to the external data source comparator module 148 to compare the untrusted location source information with known centroid information, a second request signal (i.e., an internal signal) to the internal data source comparator module 150 to compare the untrusted location source information with known historical location source information and/or requester information, and a third request signal (i.e., an internal signal) to the location scoring module 152 to assign a quality score to the location source, rank the location source and assign a accuracy value to the location source information associated with the mobile ad request. The request router module 144 can also send a signal to the router logger module 146 to request added details pertaining to the untrusted location source information associated with an incoming mobile ad request.

The router logger module 146 can be a hardware and/or software module (that is stored in memory 160 and/or executed in processor 142). The router logger module 146 can receive from the router request module 144, a signal that requests the location details of the untrusted location source information associated with an incoming mobile ad request. The router logger module 146 can store and/or log the date, the time, the requester IP address, a requester identifier and/or any other relevant source information the enterprise server 130 may include with the mobile ad request, in a database or look-up table stored in, for example, the memory 160 of the location service device 140.

The external data source comparator module 148 can be a hardware and/or software module (that is stored in memory 160 and/or executed in processor 142). The external data source comparator module 148 can receive a signal from the request router module 144 to compare the untrusted location source information associated with a mobile ad to known centroid information. The external data source comparator module 148 can compare such untrusted location source information to locations known to commonly represent larger, less precise geographical areas known as centroids and/or locations known to be supplied by intermediary third parties as representing multiple locations that can be accessed by the location service device 140 from external data sources (see, e.g., FIG. 2 and the related description below). The set of known centroids from external data sources can include, for example (but not limited to): (i) third party databases for resolving the geographical location of an IP address; (ii) mapping databases that provide the center point of a postal code and/or political boundaries; (iii) major metropolitan landmarks (e.g., New York City's City Hall); (iv) analysis of ad request location sources from exchanges that are frequently repeated over time ("inorganic" location sources); (v) published latitudes and longitudes that are associated with major businesses, cities, regions, or attractions; (vi) wireless carrier databases of known cellular tower locations. If the request for matching the untrusted location source information associated with incoming mobile ad requests with known centroid locations in external data sources yields a positive result, the external data source comparator module 148 can add an identifier to the untrusted location source data that can match the untrusted location source to a known centroid location, and also can also define the untrusted location source as a "synthetic" location. Additionally, the external data source comparator module 148 can send the results of the centroid match request to the request router module 144 and/or the location scoring module 152.

The internal data source comparator module 150 can be a hardware and/or software module (that is stored in memory 160 and/or executed in processor 142). The internal data source comparator module 150 can receive a request signal (i.e., an internal signal) from the router request module 144 to compare the untrusted location source information with known historical location source information and/or requester information. The internal data source comparator module 150 can compare such untrusted location source information to known (e.g., a specific pre-determined time period) location source historical data and/or known results of location source and requester traffic pattern analysis that are stored internally within a database or a look-up table in the memory 160 of the location service device 140. Examples of location source historical data can include, for example, recently detected location source data associated with a mobile compute device that is more accurate than the location source data included in a mobile ad request, supplemental IP address of a mobile compute device (i.e., source of a mobile ad request), derived home and work locations for a compute device, and/or the like. If the request for matching the untrusted location source information associated with incoming mobile ad requests with the parameters described above yields a positive result, (e.g., if the untrusted location source information is statistically overrepresented in the historical location source information, as described in further detail with respect to the traffic analysis module 154) the internal data source comparator module 150 can add an identifier to the untrusted location source data that identifies the location source as a viable synthetic location source. Additionally, the internal data source comparator module 150 can send the results of the match request to the router request module 144 and/or the location scoring module 152.

In some instances, the untrusted location source information can be overrepresented in the historical location source information simply because the untrusted location source information represents a frequently-visited location. For example, if the untrusted location source information identifies the Lincoln Memorial, it could be statistically overrepresented because it is spoofed location data, or it could be statistically overrepresented because many more people visit the Lincoln Memorial than an arbitrary location. Thus, in some embodiments, it may be desirable to distinguish between "organic outliers" and "synthetic outliers." Synthetic outliers tend to be very tightly clustered. For example, a synthetic outlier may be a very precise location, having relatively low frequency locations immediately adjacent. Organic outliers, however, tend to be more diffuse, such that the frequency of many locations nearby the organic outlier have higher than median frequencies in the historical location source information. Thus, in some embodiments, organic outliers can be distinguished from synthetic outliers by comparing locations near the statistically overrepresented untrusted source location data. If another location within a predefined distance (e.g., 20 feet, 50 feet, 100 feet, etc.) is also statistically overrepresented, that can be an indication that the outlier is an organic outlier. In some instances, organic outliers can be assigned higher accuracy scores than synthetic outliers.

The location scoring module 152 can be a hardware and/or software module (that is stored in memory 160 and/or executed in processor 142). The location scoring module 152 can receive the results of the matching (or comparison) process from the external data source comparator module 148 and the internal data source comparator module 150. Additionally, the location scoring module 152 can also receive a signal from the router request module 144 to assign a quality score to the location source, rank the location source and assign a accuracy value to the location source information associated with the mobile ad request. The location scoring module 152 can assign a quality score and/or a accuracy value to the location source data associated with the incoming mobile ad request based on, for example, the centroid match results, known location source information (e.g., mobile compute device IP address, mobile compute device identifier, etc.) match results, known requester performance pattern (e.g., past enterprise server 130 mobile ad request traffic patterns) match results, and/or the like. The location scoring module 152 can rank each of the incoming mobile ad requests based on the quality score and a accuracy value assigned to the location source of the mobile ad request such that the mobile ad request with the highest ranking location source data is matched with the appropriate geo-targeted ad. The location scoring module 152 can derive and/or define a accuracy value based on the nature of the location source, and can thus use the accuracy value in conjunction with the quality score to enhance the quality of assignment of the mobile ad request to the appropriate geo-targeted ad (sent by an advertiser). The location scoring module 152 can send the results of the scoring process to the router request module 144.

The location traffic analysis module 154 can be a hardware and/or software module (that is stored in memory 160 and/or executed in processor 142). The location traffic analysis module 154 performs periodic or substantially periodic processing of mobile ad request traffic patterns to identify suspected synthetic location sources and/or to gauge the expected performance of known requesters of mobile ads (e.g., the enterprise server 130), and/or relevant information of known location sources of mobile ad requests (e.g., latitude and longitude data associated with known compute devices 110), and store the results of said analyses in a database or a look-up table in the memory 160 of the location service device 140. For example, the location traffic analysis module 154 can compile and/or store (e.g., in memory 160) a table or database listing the frequency of incidences of each location in the table. For example, if three signals reporting location A are received, three entries associated with location A can be made in the database, and location A can have a frequency of three. The location traffic analysis module 154 can further be operable to calculate statistical parameters for the frequency table, such as the mean frequency, median frequency, and/or other measure of central tendency, such as log-median frequency (i.e., the median after calculating a logarithm of the frequency of each location), and/or measures of frequency distribution, such as standard deviation log-standard deviation of frequencies (i.e., the standard deviation after calculating a logarithm of the frequency of each location), etc. In some instances, the location traffic analysis module 154 can receive a signal from the location scoring module 152 and/or the internal data source comparator module 150 to send the results of said analyses. In such instances, the location traffic analysis module 154 can send the results of the requester and/or location source performance analysis to the location scoring module 152 and/or the internal data source comparator module 150 such that the internal data source comparator module 150 can identify a synthetic location based on that location being statistically overrepresented (e.g., more than a predetermined number such as 2, 3, 3.5, 4, or any other suitable number of standard deviations higher than a central tendency of the historical location data).

The service front end module 156 can be a hardware and/or software module (that is stored in memory 160 and/or executed in processor 142). The service front end module 156 can send incoming mobile ad requests to various modules in the location service device 140 such as, for example, the router request module 144, and/or other external devices such as, for example, the real-time bidding server 170, the content server 190, and/or the like. The service front end module 156 can also send trusted mobile ad requests that are scored, ranked and includes an accuracy value associated with the location source information to different external devices such as, for example, the real-time bidding server 170, the content server 190, the enterprise server 130, and/or the like. The service front end module 156 can also record and/or log the arrival of the different incoming mobile ad requests with untrusted location source information and/or the departure of outgoing mobile ad requests with trusted location source information to different external devices.

The real time bidding server 170 can be, for example, a web server, an application server, a proxy server, a telnet server, a file transfer protocol (FTP) server, a mail server, a list server, a collaboration server and/or the like. The real time bidding server 170 includes a memory 172 and a processor 174. The memory 172 can be, for example, a random access memory (RAM), a memory buffer, a hard drive, a database, an erasable programmable read-only memory (EPROM), an electrically erasable read-only memory (EEPROM), a read-only memory (ROM) and/or so forth. The memory 172 can store data and/or instructions to cause the processor 174 to execute modules, processes and/or functions associated with the real time bidding server 170 and/or the system 100. The processor 174 can be a general purpose processor, a Field Programmable Gate Array (FPGA), an Application Specific Integrated Circuit (ASIC), a Digital Signal Processor (DSP), and/or the like. In some configurations, the processor 174 can be configured to run and/or execute application modules, processes and/or functions associated with the real time bidding server 170 and/or the system 100.

The real time bidding server 170 can implement server-server integration for the different devices in the system 100, where different advertisers (e.g., via the exchange server 180) can evaluate and bid on the different mobile ad requests with an organic location source information and/or mobile ad requests with trusted "synthetic" location source information. Such evaluation and bids can be based on the advertising campaign goals of the different advertisers and the cost thresholds associated with the mobile ad requests. The real time bidding server 170 can communicate with the location service device 140 and/or other devices in the system 100 to evaluate the feasibility and commercial practicality of bidding for a specific mobile ad request. For example, in some instances, a user operating a mobile compute device 110 in a specific location can send a mobile ad request via, for example, accessing the CNN webpage. In such instances, a first advertiser (e.g., Starbucks coffee) with a store within walking distance of the source of the mobile ad (e.g., the mobile compute device 110) can be willing to pay a premium price to advertise their latest specials on the CNN webpage displayed on the mobile compute device 100. In such instances, a second advertiser (e.g., Best Buy stores) with no stores within driving distance of the mobile compute device 110 may not be willing to bid for the specific mobile ad request. The real time bidding server 170 can send the location source information associated with a mobile ad request to the exchange server 180 so that different advertisers can make informed decisions on bidding for a specific mobile ad request.

The exchange server 180 can be, for example, a web server, an application server, a proxy server, a telnet server, a file transfer protocol (FTP) server, a mail server, a list server, a collaboration server and/or the like. The exchange server 180 includes a memory 182 and a processor 184. The memory 182 can be, for example, a random access memory (RAM), a memory buffer, a hard drive, a database, an erasable programmable read-only memory (EPROM), an electrically erasable read-only memory (EEPROM), a read-only memory (ROM) and/or so forth. The memory 182 can store data and/or instructions to cause the processor 184 to execute modules, processes and/or functions associated with the exchange server 180 and/or the system 100. The processor 184 can be a general purpose processor, a Field Programmable Gate Array (FPGA), an Application Specific Integrated Circuit (ASIC), a Digital Signal Processor (DSP), and/or the like. In some configurations, the processor 184 can be configured to run and/or execute application modules, processes and/or functions associated with the exchange server 180 and/or the system 100.

The exchange server 180 can facilitate the real-time bidding for buying and selling of advertising inventory from multiple advertisers (or advertising agencies). The exchange server 180 can include information such as, for example, advertising campaign requirements for location source accuracy, funds allocated to bid for and/or purchase mobile ad requests, commercial business locations of an enterprise, information associated with access to different geo-targeted mobile ads (e.g., via the content server 190) for various advertisers (or advertising agencies). In addition or alternatively, the exchange server 180 can include information about the mobile communication device of the ad source such as for example the model or type of source mobile communication device, the network carrier on which the source mobile communication device is connected, the type of software application on the source mobile communication device that generated the ad request and/or the content of software application on the source mobile communication device that generated the ad request. Similarly, the exchange server 180s can include information about the ad request such as for example the time of day or the day of the week that the ad request was made. The exchange server 180 can serve as a platform to allow mobile ad request publishers (i.e., enterprise server 130) and advertisers to communicate and connect either through the location service device 140 and the real time bidding server 170 or directly through the real time bidding server 170.

The content server 190 can be, for example, a web server, an application server, a proxy server, a telnet server, a file transfer protocol (FTP) server, a mail server, a list server, a collaboration server and/or the like. The content server 190 includes a memory 192 and a processor 194. The memory 192 can be, for example, a random access memory (RAM), a memory buffer, a hard drive, a database, an erasable programmable read-only memory (EPROM), an electrically erasable read-only memory (EEPROM), a read-only memory (ROM) and/or so forth. The memory 192 can store data and/or instructions to cause the processor 194 to execute modules, processes and/or functions associated with the content server 190 and/or the system 100. The processor 194 can be a general purpose processor, a Field Programmable Gate Array (FPGA), an Application Specific Integrated Circuit (ASIC), a Digital Signal Processor (DSP), and/or the like. In some configurations, the processor 194 can be configured to run and/or execute application modules, processes and/or functions associated with the content server 190 and/or the system 100.

The content server 190 can be a third party server distinct from the advertiser and/or the requester (mobile ad) with which the location service device 140 is operably coupled. The content server 190 can be, for example, a web server, a proxy server, a telnet server, a file transfer protocol (FTP) server, a mail server, a list server, a collaboration server, and/or the like. The content server 190 can store untargeted mobile ads and/or various levels of geo-targeted mobile ads associated with various advertisers that may or may not be associated with either the real time bidding server 170 and/or the exchange server 180. The content server 190 is operably coupled to the location service device 140 (e.g., via the service front end module 156), the real time bidding server 170, and the exchange server 180.

FIG. 2 is a system block diagram showing the different external data sources and internal data sources accessible to the location service device, according to an embodiment. The external data sources include the postal code (or zip code) centroid data database 221, the metro centroid data database 222, the country centroid data database 223, the cellular antennae location data database 224, the landmark centroid data database 225, and the IP-to-lat-long mapping database 226. The external data sources can be located in databases or look-up tables located in storage devices that are external to the location service device 240. The different external data sources can be operably coupled to the location service device 240 via the network 220 that can include an intranet, an Internet Service Provider (ISP) and the Internet, a cellular network, and/or the like. Note that location service device 240 can be similar to location service device 140 in FIG. 1, and network 220 can be similar to network 120 in FIG. 1.

The postal code (or zip code) centroid data database 221 can be a database or a look-up table stored in the memory of an external storage device (e.g., a server) and can include centroid data indicating the mean values of the coordinates of all the latitudes/longitudes (lat-long) for the given boundaries of a specific postal area code (or zip code). Such postal code centroid data are different for the different sources of mobile ad requests (e.g., different compute devices can be located in different geographical locations with significant difference in the number and/or size of a postal code and can also have different cellular service providers), the different requesters (e.g., enterprise webpages), and different advertisers (e.g., advertising agencies).

The metro centroid data database 222 can be a database or a look-up table stored in the memory of an external storage device (e.g., a server) and can include centroid data indicating the mean values of the coordinates of all the lat-long for a given metropolitan area. Such metro centroid data are also different for the different sources of mobile ad requests, the different requesters, and different advertisers. The metro centroid data can include the metropolitan statistical area (MSA) data that can be obtained from, for example, the US Office of Management and Budget (OMB). The metro centroid data also can include the combined statistical area (CSA) data that is defined as location data associated with an area defined by a group of adjacent MSAs. The metro centroid data further can include the designated market area (DMA) data that is associated with a geographical area designated as the local market space for products and services sold in a specific geographical location. The three different kinds of centroid data discussed above (MSA, CSA and DMA) are examples of standard definitions of metropolitan areas.

The country centroid data database 223 can be a database or a look-up table stored in the memory of an external storage device (e.g., a server) and can include centroid data indicate indicating the mean values of the coordinates of all the lat-long contained within the geographical boundaries of a sovereign country. Such country centroid data are also different for the different sources of mobile ad requests, the different requesters, and different advertisers.

The cellular antennae location data database 224 can be a database or a look-up table stored in the memory of an external storage device (e.g., a server) and can include centroid data indicating location source data based on cellular triangulation. Cellular triangulation collects data by tracking the strength of the signal (e.g., a mobile ad request signal) observed on a mobile compute device from different cellular network antenna towers and approximates the geographical location of the device within 25-100 meters based on the fixed locations of the cellular network antenna towers themselves.

The landmark centroid data database 225 can be a database or a look-up table stored in the memory of an external storage device (e.g., a server) and can include centroid data indicating the published coordinates (e.g., the coordinates published by a mapping service, such as Google Maps) and/or mean values of the coordinates of all the lat-long for a given landmark or point of interest (e.g., Mount Rushmore, Hoover Dam, Golden Gate Bridge, etc.). Such landmark centroid data are also different for the different sources of mobile ad requests, different requesters, and different advertisers.

The IP-to-lat-long mapping database 226 can be a database or a look-up table stored in the memory of an external storage device (e.g., a server) and can include centroid data characterizing the mapping or pairing of an IP address of a mobile compute device connected to the public Internet (e.g., via the network 220 in FIG. 2) to a real geographical location (e.g., defined by a lat-long value). IP-to-lat-long mapping involves mapping the IP addresses of a compute device to a country, a metropolitan area (e.g., a city), a latitude, a longitude, an internet service provider (ISP) information, and/or like. It should be noted that because the external data sources described above typically reside in a third party database (external to the location service device 240) and are accessed by the location service device 240 via the network 220 to identify the geographical location of a mobile compute device, the accuracy of comparison between the different centroid data and the untrusted location source information associated with a mobile ad request is dependent on the quality of the data stored in the third party databases described above. Note that FIG. 2 shows six different databases as part of the external data sources as an example only and not a limitation. In other configurations, the external data sources can include either more than six different databases or less than six different databases.

The historical data of location source and traffic pattern analysis database 227 can be an internal data source (e.g., controlled by the entity that controls the location service device 240) and can be a database or a look-up table stored in the memory of the location service device 240 or separate from and accessible by the location service device 240. The historical data of location source and traffic pattern analysis database 227 can include results of past data analysis (performed by the location service device 240) applied to mobile ad requests and mobile ad request traffic patterns. The output of such analysis is related to the quality score (and ranking) of the location source information associated with past mobile ad requests and the accuracy value assigned. Such rankings of the known or historical mobile ad request traffic can be used for evaluating in real-time location source information associated with new incoming mobile ad request traffic.

Additionally, in some instances, the historical data of location source and traffic pattern analysis database 227 can also include a list of known or historical lat-long values that had been accessed by the location service device 240 in the past. Such lat-long values may have been accessed by the location service device 240, for example, thousands of times or hundreds of thousands of times in the past, and are associated with multiple dates and times of access, a variety of location sources and IP addresses of compute devices. Such lat-long values can be flagged by the location service device 240 as being an "inorganic" location source (i.e., not specific to an actual geographical location of a mobile compute device) upon performing statistical frequency analysis on the incoming mobile ad requests to determine which sources of mobile ad requests tend to cluster their locations on a specific lat-long. Hence, by establishing thresholds for location source accuracy and frequency, the location service device 240 can flag certain lat-long (i.e., geographical locations) as inorganic and filter or score them accordingly.

Note that although the various external data sources are shown in FIG. 2 as being coupled to location service device 240 through network 220, other arrangements are possible. For example, in some instances, location service device 240 can access the external data sources through the network 240 as the data is needed. Alternatively, in other instances, data from external data sources can be accessed before the data is needed and copies downloaded and stored a locations local to and/or directly accessible by location service device 240. In yet instances, the data from external data sources can be accessed in a combination of such approaches: some data from external data sources can be accessed as needed, some data external data sources can be accessed beforehand and stored locally, etc.

Figure 3:
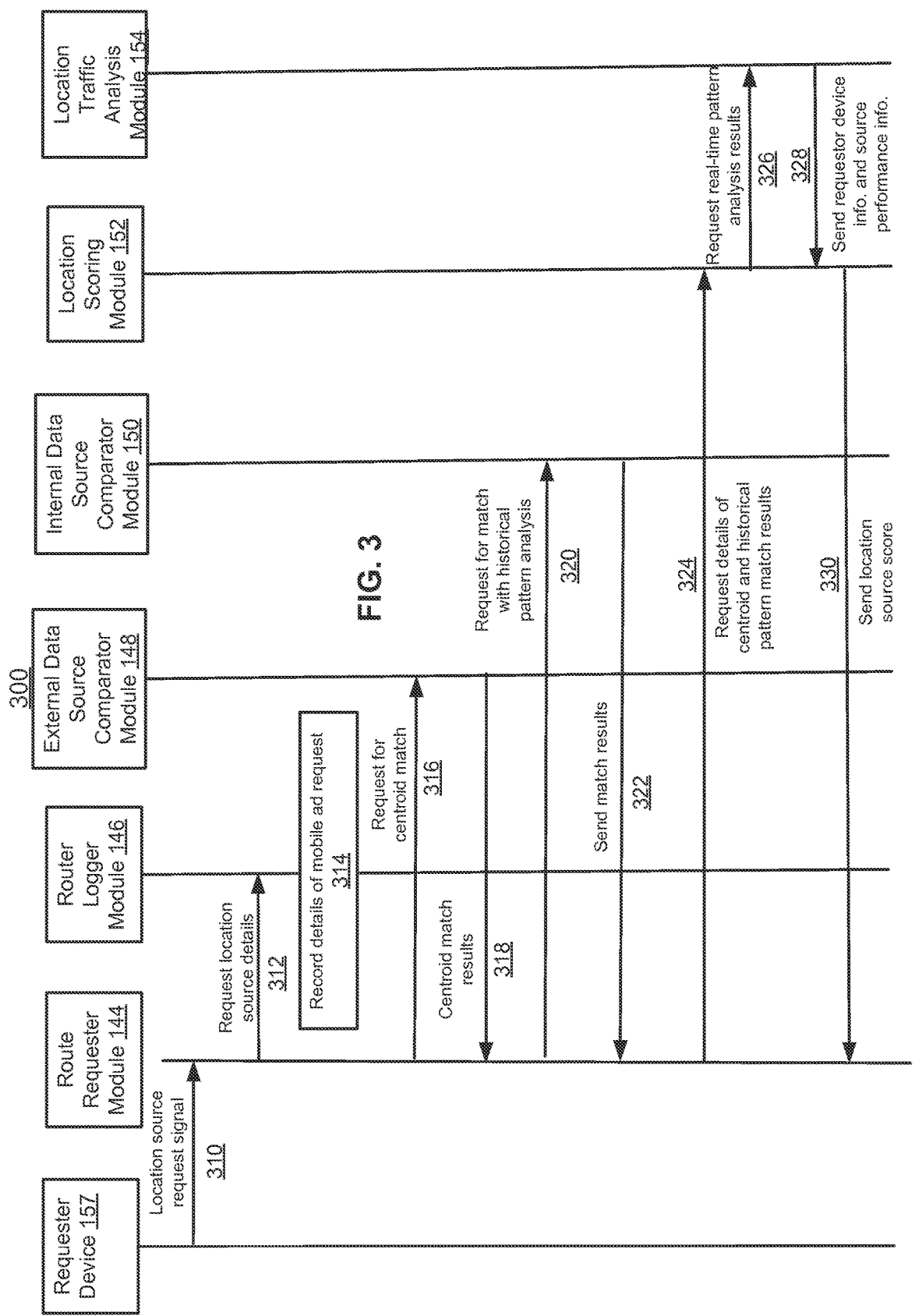
FIG. 3 is a message flow diagram illustrating a process for scoring the location source information associated with a mobile ad request, according to an embodiment.

FIG. 3 is a message flow diagram illustrating a process for scoring the location source information associated with a mobile ad request, according to an embodiment. FIG. 3 is discussed in reference to the system for detecting untrusted location source information on mobile ad requests 100, but the method flow 300 of FIG. 3 could be applied to other systems. At 310, a requester device 157 initiates the process of scoring the location source information associated with a mobile ad request by sending a location source request signal to the router request module 144. In some instances, the scoring process can be initiated via the service front end module 156 (shown in FIG. 3), and in other instances, the scoring process can be initiated via the real time bidding server 170 (not shown in FIG. 3). The location source request signal can include, for example, untrusted latitude of the source, untrusted longitude of source, the IP address of the mobile compute device, and any other optional location source information the requester of the mobile ad may have made available. The router request module 144 receives the location source request signal from the requester device 157 and sends a signal requesting location source details to the router logger module 146, at 312. At 314, the router logger module 146 can store and/or log the details of the mobile ad request such as, for example, the date, the time, the requester IP address, a requester identifier and/or any other relevant location source information provided by the requester device 157 in a database or look-up table stored in the memory of the location service device.

At 316, the router request module 144 can send a signal to the external data source comparator module 148 to compare the location source information associated with the mobile ad request to location sources known to commonly represent larger, less accurate geographical areas (centroids) that can be accessed by the location service device from external data sources via the network 120. The set of known centroids from external data sources can include for example (but are not limited to) third party databases for resolving the geographical location of an IP address, mapping databases that provide the center point of postal code and political boundaries, major metropolitan landmarks, analysis of mobile ad request locations from exchanges that are frequently repeated over time ("inorganic" location sources), published latitudes and longitudes that are associated with major businesses, cities, regions, or attractions, wireless carrier databases of cell site locations.

If the request for matching the untrusted location source information associated with the incoming mobile ad request with known centroid locations in external data sources yields a positive result, the external data source comparator module 148 marks the untrusted location source data as a known centroid location, marks the untrusted location source as a "synthetic" location, and sends the results of the centroid match request to the router request module 144 (shown in FIG. 3) and/or the location scoring module 152 (not shown in FIG. 3), at 318.

At 320, the router request module 144 can send a signal to the internal data source comparator module 150 to compare the location source information associated with the mobile ad request to historical location source data and known results of location source and mobile ad request traffic pattern analysis that are stored internally within the location service device. If the request for matching the untrusted location source information associated with the incoming mobile ad requests with the parameters discussed above yields a positive result, the internal data source comparator module 150 marks the untrusted location source data as a viable synthetic location source and sends the results of the match request to the router request module 144 (shown in FIG. 3) and/or the location scoring module 152 (not shown in FIG. 3), at 322.

At 324, the router request module 144 can send a signal to the location scoring module 152 to request for the details of the centroid and historical pattern match results. The location scoring module 152 can receive the results of the matching (or comparison) process from the external data source comparator module 148 and the internal data source comparator module 150. At 326, the location scoring module 152 can send a signal to the location traffic analysis module 154 requesting information associated with the real-time and/or the most recent processing of mobile ad request traffic patterns to identify suspected synthetic and/or inorganic location sources, and to gauge the expected performance of each requester device 157 and/or the location source.

At 328, the location traffic analysis module 154 can send the results of the most recent requester and/or location source performance analysis to the location scoring module 152 (shown in FIG. 3) and/or the internal data source comparator module 150 (not shown in FIG. 3). The location scoring module 152 can assign a quality score and/or a accuracy value to the synthetic location source data associated with the incoming mobile ad requests based on, for example, the centroid match results, the internal data source match results, available location source information, historical requester performance patterns, and/or the like. The location scoring module 152 can rank each of the incoming mobile ad requests based on the score and accuracy value assigned to the location source of the mobile ad request signal. At 330, the location scoring module 152 can send the results of the scoring process to the router request module 144. In some embodiments, if the accuracy value is below a low accuracy threshold (e.g., if the location scoring module 152 determines that the location source data is spoofed), the location scoring module 152 can send a signal to the router request module 144 such that the router request module 144 and/or a compute device communicatively coupled to the router request module 144 can disregard and/or discount the source location data.

Figure 4:
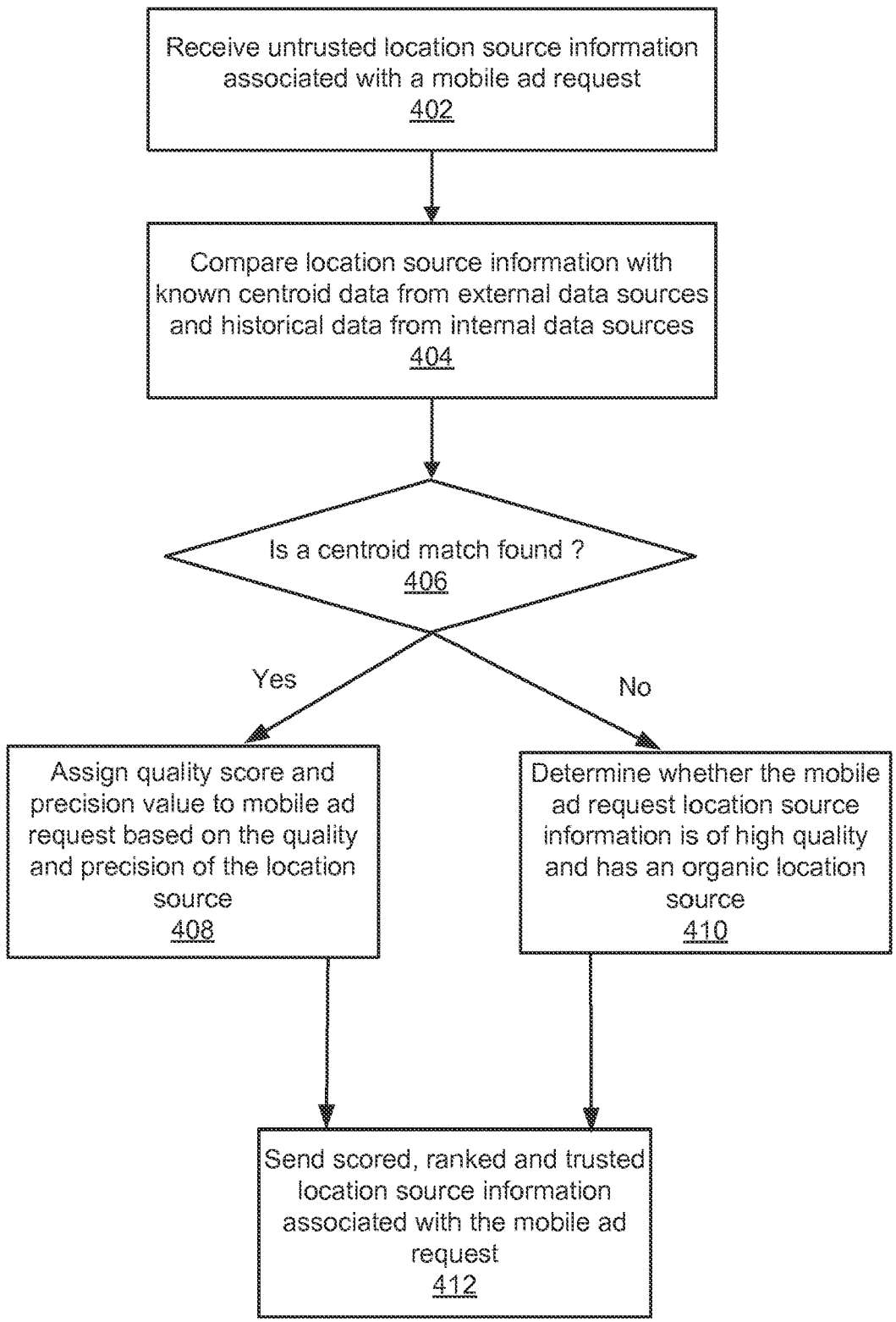
FIG. 4 is a flow chart illustrating a method for analyzing and scoring untrusted location source information, according to another embodiment.

FIG. 4 is a flow chart illustrating a method for analyzing and scoring untrusted location source information associated with a mobile ad request, according to another embodiment. The method 400 includes receiving untrusted location source information associated with an incoming mobile ad request, at 402. As described above, the mobile ad request can be received at, for example, the location service device and can be sent from example, the enterprise server and/or the real time bidding server. As described above, location source information can be untrusted when, for example, the location source information does not include a highly defined lat-long value associated with the location source (e.g., a mobile compute device) and/or does not include a accuracy value associated with the location source. As described above, the location source information can include, for example, untrusted latitude of the source, untrusted longitude of the source, the IP address of the mobile compute device, and/or any other optional location source information the requester of the mobile ad may have made available.

At 404, the location source information associated with the mobile ad request is compared with known centroid data from external data sources and historical data from internal data sources. As described above, the location source information is compared with known centroid data at, for example, the external data source comparator module. As described above, the set of known centroids from external data sources can include for example (but are not limited to) third party databases for resolving the geographical location of an IP address, mapping databases that provide the center point of postal code and political boundaries, major metropolitan landmarks, analysis of mobile ad request locations from exchanges that are frequently repeated over time ("inorganic" location sources), published latitudes and longitudes that are associated with major businesses, cities, regions, or attractions, wireless carrier databases of cell site locations. As described above, the location source information is compared with historical data at, for example, the internal data source comparator module. As described above, the set of historical data used to compare with the location source information include, for example, known or historical location source data and known results of mobile ad request traffic pattern analysis that are stored internally within, for example, the location service device.

At 406, a determination is made at, for example, the location service device if the location source information of the mobile ad request can be matched with a known centroid data. If a successful match of the location source information of the mobile ad request with a known centroid data occurs, the location source of the mobile ad request is marked as "synthetic" by, for example, the external data source comparator module. At 408, a quality score and/or a accuracy value is assigned by, for example, the location scoring module to the synthetic location source data associated with the mobile ad request based on, for example, the centroid match results, available location source information, historical location source performance patterns, and/or the like. The mobile ad requests can also be ranked based on the quality score and accuracy value assigned to the location source of the mobile ad request signal by, for example, the location scoring module.

If a successful match of the location source information of the mobile ad request with a known centroid data does not occur, a determination is made to ascertain whether the location source information associated with the mobile ad request is of high quality and has an organic location source data, at 410. In some instances, such a determination can be made at, for example, the internal data source comparator module and the location traffic analysis module. Such a determination can be made by comparing the location source information with historical location source data, known results of mobile ad request traffic pattern analysis that can identify suspected synthetic or inorganic location sources.

At 412, a scored, ranked and trusted location source information associated with a mobile ad request is sent from, for example, the location service device to, for example, the enterprise server and/or the real time bidding server. As described above, a location source information can be considered to be trusted when, for example, the location source information associated with the mobile ad request does include a highly accurate lat-long value associated with the location source (e.g., a mobile compute device) and/or include a accuracy value associated with the location source and/or include other attributes that can ascertain that the location source is an organic and actual (i.e., not derived or synthesized) geographical location. In other instances, location source information can be considered to be trusted when received from a mobile device such that any intermediary devices are known to not alter location source information calculated by the mobile communication device.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and/or computer code (also can be referred to as code) may be those designed and constructed for the specific purpose or purposes. For example, the media and/or computer code can be operable to cause the processor to execute methods described herein. Similarly stated, where methods are described herein, it should be understood that such methods can be computer-implemented methods.

Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above. Although various modules in the different devices are shown to be located in the processors of these devices, these various modules can also be located/stored in the memory of the devices (e.g., software modules stored in memory) and can be accessed and executed by the processors.

What is claimed is:

1. An apparatus, comprising:
  a network module configured to receive a signal identifying an untrusted location, the untrusted location associated with a mobile communication device, the untrusted location having an unknown accuracy;
  a first data source comparator module implemented in at least one of a processor or a memory, the first data source comparator module configured to compare the untrusted location to a database of known spoofed locations to define a first match when the untrusted location matches a known spoofed location from the database;
  a second data source comparator module implemented in at least one of a processor or memory, the second data source comparator module configured to compare the untrusted location to a plurality of locations previously received by the network module to define a second match when the untrusted location is statistically over-represented in the plurality of locations; and
  a spoofed location detection module operably coupled to the first data source comparator module, the second data source comparator module, and the network module, the spoofed location detection module configured to determine if the untrusted location was determined by the mobile communication device, the spoofed location detection module configured to determine based, at least in part, on at least one of (1) the first match, or (2) the second match.

2. The apparatus of claim 1, wherein the network module is configured to send a signal including the untrusted location and an indication that the untrusted location is spoofed.

3. The apparatus of claim 1, further comprising:
  a location scoring module operably coupled to the second data source comparator module, the location scoring module configured to estimate an accuracy of the location based, at least in part, on the second data source comparator module comparing the location to the plurality of locations preciously received by the network module.

4. The apparatus of claim 1, wherein the database of known spoofed locations includes at least one of (1) a table of IP addresses linked to locations, (2) major metropolitan landmarks, or (3) cellular tower locations.

5. A non-transitory processor readable medium storing code representing instructions to be executed by a processor, the code comprising code to cause the processor to:
  receive, from a first server, a signal including untrusted location data;
  define an accuracy score for the untrusted location data based, at least in part, on a comparison of the untrusted location data to a plurality of predefined synthetic locations, each predefined synthetic location from the plurality of synthetic locations being a single location that a third party represents as corresponding to multiple locations; and
  send, to a second server, a signal including the untrusted location data and the accuracy score for the untrusted location data.

6. The non-transitory processor readable medium of claim 5, wherein the untrusted location data is spoofed location data, and the accuracy score is defined such that, when the accuracy score is below a threshold level, the untrusted location data can be identified as spoofed location data.

7. The non-transitory processor readable medium of claim 5, wherein:
  the untrusted location data is associated with a mobile communication device;
  the accuracy score is below a low accuracy threshold; and
  the code to cause the processor to send the signal including the accuracy score includes code to cause the processor to send the signal such that the second server disregards the untrusted location data when evaluating a location of the mobile communication device.

8. The non-transitory processor readable medium of claim 5, wherein each synthetic location from the plurality of synthetic locations is a centroid of a geographic area.

9. The non-transitory processor readable medium of claim 5, wherein the each synthetic location from the plurality of synthetic locations is a published location associated with a point of interest.

10. The non-transitory processor readable medium of claim 5, wherein:
  the untrusted location data is associated with a mobile communication device; and
  the code configured to cause the processor to define the accuracy score includes code to cause the processor to calculate the accuracy score based on a likelihood that the untrusted location data was supplied by a device other than the mobile communication device.

11. The non-transitory processor readable medium of claim 5, wherein:
the untrusted location data is associated with a mobile communication device;
the first server is not the mobile communication device; and
the code configured to cause the processor to calculate the accuracy score includes code to cause the processor to estimate a probability that the untrusted location data was supplied by the first server.

12. The non-transitory processor readable medium of claim 5, wherein the first server is the second server.

13. The non-transitory processor readable medium of claim 5, the code further comprising code to cause the processor to receive a request to verify the accuracy of the location data, the accuracy score defined in response to the request.

14. The non-transitory processor readable medium of claim 5, wherein the signal including the untrusted location data is a first signal including first untrusted location data, the code further comprising code to cause the processor to:
define a record in a database for the first location data;
receive a signal including second untrusted location data after defining the record in the database, the second untrusted location data matching the first untrusted location data;
define an accuracy score for the second untrusted location data based, at least in part, on a probability of the untrusted second location data matching the first untrusted location data; and
send a signal including the second untrusted location data and the accuracy score for the second untrusted location data.

15. The non-transitory processor readable medium of claim 14, wherein
the code to cause the processor to define the accuracy score for the second untrusted location data includes code to cause the processor to define the accuracy score for the second untrusted location data based, at least in part, on a comparison of the second untrusted location data to the plurality of synthetic locations.

16. A non-transitory processor readable medium storing code representing instructions to be executed by a processor, the code comprising code to cause the processor to:
receive a plurality of signals, each signal from the plurality of signals identifying a location from a plurality of locations;
define a record in a database for each location from the plurality of locations;
receive a signal identifying an untrusted location;
define an accuracy score for the untrusted location based, at least in part, on a number of records in the database matching the untrusted location in the database; and
send, a signal including the untrusted location and the accuracy score for the location.

17. The non-transitory processor readable medium of claim 16, wherein:
the untrusted location is a first untrusted location; and
a signal from the plurality of signals identifies a second untrusted location.

18. The non-transitory processor readable medium of claim 16, wherein a record in the database matches the untrusted location when a location for that record exactly matches the untrusted location.

19. The non-transitory processor readable medium of claim 16, wherein:
each location from the plurality of locations has a precision;
the untrusted location has a precision; and
a record in the database matches the untrusted location when a location for that record matches the untrusted location within the lesser of (1) the precision of that location from the plurality of locations or (2) the precision of the untrusted location.

20. The non-transitory processor readable medium of claim 16, wherein a record in the database matches the untrusted location when a location for that record is within a predetermined distance of the untrusted location.

21. The non-transitory processor readable medium of claim 16, wherein:
the untrusted location is a first location,
each location from the plurality of locations appears in the database with a frequency such that the database has a measure of central tendency of frequency, the code further comprising code to cause the processor to:
identify a plurality of records in the database for a second location matching the first location, a frequency of the second location being more than a predetermined number of standard deviations from the measure of central tendency of frequency.

22. The non-transitory processor readable medium of claim 21, the code further comprising code to cause the processor to:
determine that the frequency of the second location is a synthetic outlier based on matching the second location to a predefined synthetic location from a plurality of predefined synthetic locations, each predefined synthetic location from the plurality of synthetic locations being a single location that a third party represents as corresponding to multiple locations; and
the code to cause the processor to define the accuracy score for the first location includes code to cause the processor to define a low accuracy score based, at least in part, on (1) the frequency of the second location being more than a predetermined number of standard deviations the measure of central tendency of frequency and (2) determining that the frequency of the second location is a synthetic outlier.

23. The non-transitory processor readable medium of claim 21, the code further comprising code to cause the processor to:
determine that the frequency is an organic outlier based on the second location not matching a predefined synthetic location from a plurality of predefined synthetic locations, each predefined synthetic location from the plurality of synthetic locations being a single location that a third party represents as corresponding to multiple locations; and
the code to cause the processor to define the accuracy score for the first location includes code to cause the processor to define an accuracy score greater than a low accuracy score based, at least in part, on determining that the frequency of the second location is an organic outlier.

24. The non-transitory processor readable medium of claim 21, the code further comprising code to cause the processor to:
select a third location within 100 feet of the second location; and determine that the third location appears in the database with a frequency greater than the measure of central tendency of frequency;

determine that the second location is an organic outlier based, at least in part, on the frequency of the third location; and the code to cause the processor to define the accuracy score for the first location includes code to cause the processor to define an accuracy score greater than a low accuracy score based, at least in part, on determining that the second location is an organic outlier.

* * * * *